H. VON UNWERTH.
Garden Tool.
No. 19,457.
Patented Feb. 23, 1858.
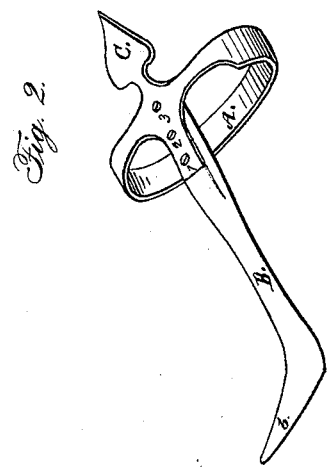
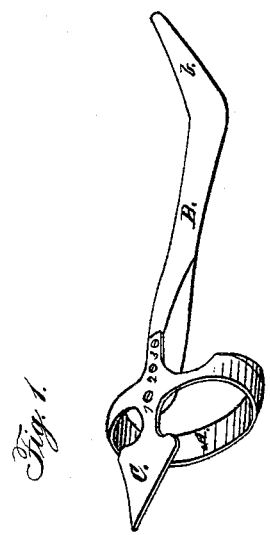

UNITED STATES PATENT OFFICE.

HARTWICH VON UNWERTH, OF SALEM, MASSACHUSETTS.

IMPROVEMENT IN GARDEN-TOOLS.

Specification forming part of Letters Patent No. 19,457, dated February 23, 1858.

*To all whom it may concern:*

Be it known that I, HARTWICH VON UNWERTH, of Salem, in the county of Essex and Commonwealth of Massachusetts, have invented a new and useful Garden-Tool, called "the Weeder, Trowel, and Dibble combined;" and I do hereby declare that the following is a full, clear, and exact description of the construction and operation of the same, reference being had to the accompanying drawings, forming a part of this specification.

To enable others skilled in the art to make and use my invention, I will now proceed to describe its construction and operation.

Figures 1 and 2 are different views of the implement in perspective.

B is a wooden handle, ten or twelve inches in length, more or less. $b$ is a continuation of the handle, bent or shaped as seen in the figures, and forming the dibble.

A is the weeder, shaped as seen in the figures, and made either of steele, malleable iron, or other suitable material, being fastened to the handle B by means of the screws or rivets 1 2 3. The inner edge of the weeder is made sharp, so as to cut all the way round to within a few inches of the handle.

C is the trowel, being made or cast in the same piece with the weeder A.

It is obvious that the size of the tool may be greater or smaller, as may be desired.

The operation is so simple as to hardly require an explanation. The broad side of the weeder may be used to clear a larger space of weeds and also to loosen the soil. The narrow oval sides of the weeder are intended to loosen the earth lightly around the young and tender plants without injuring them in the least. The use of the trowel and dibble in setting out plants and doing various kinds of garden work is obvious to all. Thus by combining three in one I not only have an instrument costing less than the three separate implements, but also much more convenient. In stead of taking three tools with him, and keeping them within reach about him, the gardener needs but one. Simply turning the tool in the hand transforms it practically into any one of the three separate implements desired.

What I claim as my invention, and desire to secure by Letters Patent, is—

The combination of the weeder, trowel, and dibble, substantially as described and for the objects specified.

HARTWICH VON UNWERTH.

Witnesses:
J. MAYER,
N. AMES.